United States Patent
Zimmer et al.

(10) Patent No.: US 7,082,523 B2
(45) Date of Patent: Jul. 25, 2006

(54) BRIDGING MEMORY ACCESS ACROSS PRE-BOOT AND RUNTIME PHASES

(75) Inventors: Vincent J. Zimmer, Federal Way, WA (US); Michael A. Rothman, Gig Harbor, WA (US)

(73) Assignee: Intel Corporation, Santa Clara, CA (US)

(*) Notice: Subject to any disclaimer, the term of this patent is extended or adjusted under 35 U.S.C. 154(b) by 514 days.

(21) Appl. No.: 10/321,022

(22) Filed: Dec. 16, 2002

(65) Prior Publication Data

US 2004/0117568 A1    Jun. 17, 2004

(51) Int. Cl.
*G06F 15/177*  (2006.01)
*G06F 12/00*   (2006.01)

(52) U.S. Cl. .................. 713/1; 719/312; 711/118
(58) Field of Classification Search .............. 713/1, 713/2; 719/312; 711/118
See application file for complete search history.

(56) References Cited

U.S. PATENT DOCUMENTS

| | | | |
|---|---|---|---|
| 5,805,880 A * | 9/1998 | Pearce et al. ................ 713/2 |
| 5,881,286 A * | 3/1999 | Kougiouris et al. ......... 719/312 |
| 5,930,503 A * | 7/1999 | Drees ............................ 713/1 |
| 6,016,392 A * | 1/2000 | Jordan ......................... 719/328 |
| 6,243,809 B1 * | 6/2001 | Gibbons et al. ............... 713/1 |
| 6,658,492 B1 * | 12/2003 | Kawahara et al. .......... 719/332 |
| 6,675,230 B1 * | 1/2004 | Lewallen ..................... 719/328 |
| 6,684,327 B1 * | 1/2004 | Anand et al. .................. 713/2 |
| 6,704,840 B1 * | 3/2004 | Nalawadi et al. ............ 711/118 |
| 6,854,123 B1 * | 2/2005 | Lewallen ..................... 719/328 |
| 6,883,172 B1 * | 4/2005 | Angeline et al. ............ 719/315 |
| 2003/0097581 A1 * | 5/2003 | Zimmer ..................... 713/200 |

* cited by examiner

*Primary Examiner*—Chun Cao
(74) *Attorney, Agent, or Firm*—Justin B. Scout (57) ABSTRACT

The present disclosure relates to bridging access to a memory space across pre-boot and runtime phases and, more particularly, to accessing the memory utilizing a separate pre-boot memory accessor and a runtime accessor.

42 Claims, 2 Drawing Sheets

Fig. 2

BRIDGING MEMORY ACCESS ACROSS PRE-BOOT AND RUNTIME PHASES

BACKGROUND

1. Field

The present disclosure relates to bridging access to a memory space across pre-boot and runtime phases and, more particularly, to accessing the memory utilizing a separate pre-boot memory accessor and a runtime accessor.

2. Background Information

Typically, the operation of computer or processing systems (hereafter, "computer") may be divided into two stages, pre-boot and runtime. The pre-boot process or phase often comprises starting or resetting a computer. When first turned on (cold boot) or reset/reboot (warm boot), a computer executes the firmware that loads and starts the computer's more complicated operating system and prepares it for use. Thus, the computer can be said to pull itself up by its own bootstraps. The runtime process or phase often occurs after the pre-boot phase and includes the execution of an operating system and other user applications. The runtime phase is typically the phase that users interact with the computer. Thus, the computer can be said to being running application programs.

Typically, during pre-boot, the computer is first powered on and has very limited capabilities because the volatile memory contains random data and no operating system is running. To begin the pre-boot phase, the processor is often reset to a known state and instructions found at a pre-defined location are executed. Traditionally, this pre-defined location is mapped to a non-volatile memory or firmware referred to as a Basic Input/Output System (BIOS). The BIOS often includes several low-level procedures to control the initialization of the hardware components that comprise the computer. Because of the historical limitations of early computers, the BIOS generally operated in what is known as "real mode." In real mode, the computer may only execute one program at a time and can access no more than 1 MB of volatile memory. Modern operating systems, on the other hand, often run in "protected mode." Protected mode allows the computer to run multiple programs substantially simultaneously, referred to as multi-taking, and there is essentially no limit to the amount of volatile memory that may be accessed.

During pre-boot, the BIOS generally confirms that the computer's hardware components, such as, for example, the CPU, memory and various add-on cards, are functioning properly. In addition, these hardware components may be configured and initialized during the pre-boot phase. Often an application may, for example, desire to collect information about a hardware component during the pre-boot phase and supply the information to a runtime phase application or driver. In this context, a driver or device driver is a specialized program that augments an operating system's capability to support a hardware component.

Traditionally, runtime applications have had substantially unfettered access to the same portions of memory as the pre-boot applications. Therefore, passing information between the pre-boot and runtime phases was relatively trivial. For example, one technique for bridging information between the two phases may include the following steps. The pre-boot application may reserve a portion of volatile memory to store the information. The pre-boot application may store a pointer to this portion of volatile memory at a predefined location. Because the pre-boot phase is often limited to accessing a maximum of 1 MB of volatile memory, this predefined location is typically below that limit. During the runtime phase, the driver may directly access the pointer and, subsequently, access the information. However, this technique involves insecure and potentially uncontrolled access to the system memory.

More current systems limit the access runtime applications have to the portions of memory the pre-boot applications have. The access of runtime applications is often limited and controlled by the operating system. Therefore, the technique above, of placing a pointer within the first MB of volatile memory, will not work. The operating system will often not allow a runtime application to make a direct access to a random address in volatile memory. A need therefore exists for a technique or apparatus to address the issue of bridging a memory between pre-boot and runtime phases.

BRIEF DESCRIPTION OF THE DRAWINGS

Subject matter is particularly pointed out and distinctly claimed in the concluding portions of the specification. The disclosed subject matter, however, both as to organization and the method of operation, together with objects, features and advantages thereof, may be best understood by a reference to the following detailed description when read with the accompanying drawings in which:

DETAILED DESCRIPTION

In the following detailed description, numerous details are set forth in order to provide a thorough understanding of the present disclosed subject matter. However, it will be understood by those skilled in the art that the disclosed subject matter may be practiced without these specific details. In other instances, well-known methods, procedures, components, and circuits have not been described in detail so as to not obscure the disclosed subject matter.

Figure 1:
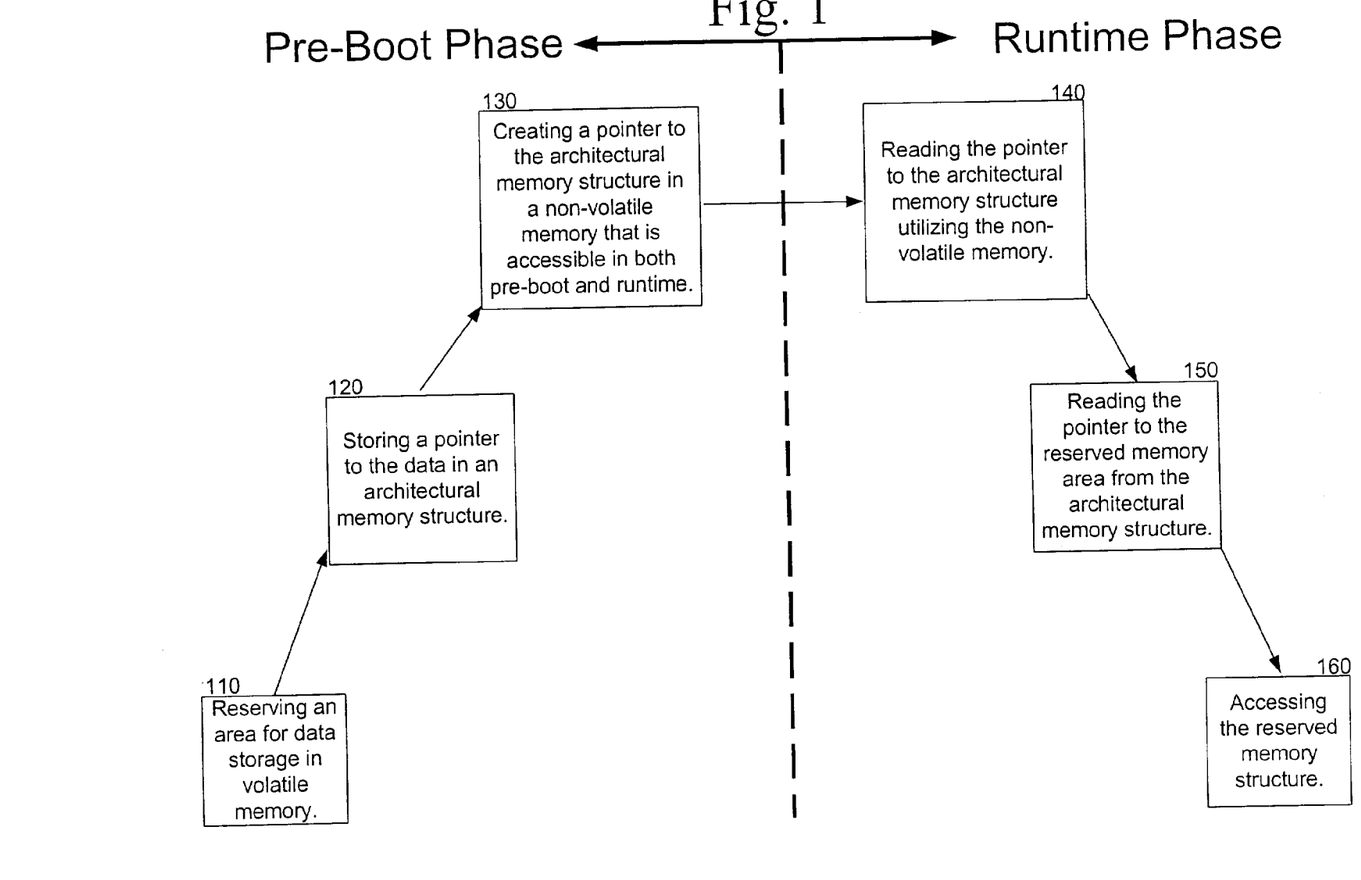
FIG. 1 is a flowchart illustrating an embodiment of a technique for bridging access to a memory space across pre-boot and runtime phases in accordance with the disclosed subject matter.

FIG. 1 is a flowchart illustrating an embodiment of a technique for bridging access to a memory space across pre-boot and runtime phases in accordance with the disclosed subject matter. Block 110 illustrates that, during the pre-boot phase, an area of volatile memory, such as, for example, system memory, may be reserved. This area may be reserved for data storage. It is contemplated that, in one embodiment, the data may be copied from a first location to the reserved memory area. It is contemplated that the data may be originally stored in a variety of locations, such as, but not limited to, the firmware of an add-on card, a mass storage device, such as, for example, a hard drive. Of course, other original storage locations are contemplated. It is also contemplated that the data may be generated, in whole or part, by a pre-boot application.

In one specific embodiment of the technique, a video add-on card may include a series of instructions and/or data stored within a non-volatile memory that is attached with the card. It may be useful for these instructions and/or data to be accessed during the runtime phase. However, the system may not allow the firmware of the video add-on card to be accessed during the runtime phase. Alternatively, it may be prohibitive to access the firmware during runtime; most operating systems run in protected mode, virtual mode, paging and multiprocessor support. In contrast, the legacy BIOS services typically execute in real mode, without virtual memory (i.e., physical mode), run only a single processor and services are dispatched from a legacy Interrupt Vector Table (IVT) at address Oh. In order to make service calls to the BIOS from the operating system (OS), the sophisticated environment of the operating system, must be torn down. This OS tear-down is often slow and causes security/reliability issues in the S since memory protections are gone during the service call. Therefore, the disclosed subject matter may, at least in part, allow the operating system or other runtime application a technique to pass firm-ware data without making a destructive service call to the BIOS.

The system may only allow access to the firmware during the pre-boot phase. Therefore, it may be necessary to copy the data or other information embodied in firmware to a location that may be accessed during the runtime phase. However, this location may change each time the system in booted. Therefore, the pre-boot phase must communicate to the runtime phase where the data is located. It may do this by following an embodiment of the technique illustrated by FIG. 1. As part of block 110, space for the instructions may be reserved within volatile memory. It is contemplated that the memory area, or pointers to the memory area, may be of a type that designates the memory area as runtime accessible.

Block 120 illustrates that a pointer to the data or the reserved memory area may be placed within an architectural memory structure. In this context, an architectural memory structure is a section of memory having data elements that are arranged in an orderly fashion and whose existence, but not necessarily contents, is defined as being part of the architecture of the computer system. It is contemplated that the architectural memory structure may exist in volatile memory, non-volatile memory or a mixture thereof. It is further contemplated that the architectural memory structure may be contiguous or non-contiguous. It is even contemplated that the architectural memory structure may be hidden or not directly accessible via operating system services during the runtime phase.

In one specific embodiment, the architectural memory structure may include a System Table or Configuration Table substantially compliant with the tables defined in the Extensible Firmware Interface (EFI) specification. *Extensible Firmware Interface (EFI) Specification*, version 1.02, Dec. 12, 2000, Intel Corp. (hereafter, "the EFI specification"). Such a table may include, for example, pointers to boot service functions, pointers to runtime service functions, version information, and an extensible set of identifier and pointer pairs. Of course, it is contemplated that other data may be found within various embodiments of an architectural memory structure.

In one specific embodiment of the disclosed subject matter, the pointer to the reserved memory area may be stored within the System Table as a Globally Unique Identifier (GUID) pointer pair. Such a pointer pair may include a pointer key that identifies the information, and may be a GUID, and a pointer value that may be the actual pointer to the reserved memory area. In an embodiment utilizing the EFI specification, the GUID pointer pair may be created by utilizing the InstallConfigurationTable boot service. It is contemplated that the pointer may be stored utilizing a different mechanism, such as, for example, storing the pointer at a pre-defined location or under a pre-defined variable name. It is also contemplated that the pointer may be stored in an indirect fashion.

Block 130 illustrates that, during pre-boot, a pointer to the architectural memory stricture itself may be stored in a non-volatile memory space that is accessible during both the pre-boot and runtime phases. It is contemplated that the non-volatile memory space may be accessible during runtime because the information it contains is shadowed in volatile memory. It is further contemplated, in one embodiment, that the non-volatile memory may be accessible utilizing an accessor application programming interface.

In one specific embodiment, the pointer to the architectural memory structure may be stored in the non-volatile memory by utilizing a pre-defined variable name, such as, for example, "System Table Proxy." However, it is contemplated that a number of variable names may be used. It is also contemplated that the pointer may be stored at a pre-defined memory address. In an embodiment utilizing the EFI specification, the location of the System Configuration Table may be stored in non-volatile memory.

After the pre-boot phase is substantially completed, the runtime phase may commence. It is contemplated that in some embodiments of the disclosed subject matter, the portions of the pre-boot and runtime phase may occur simultaneously. Block 140 illustrates that the pointer to the architectural memory structure may be read utilizing the non-volatile memory. It is contemplated that, in one embodiment, the operating system may govern the access to the non-volatile memory and that runtime applications may be prohibited from directly accessing the non-volatile memory. In one embodiment, the operating system may, for example, allow applications to read from the non-volatile memory but not write to the memory. It is also contemplated that the operating system may shadow the contents of the non-volatile memory, in whole or part, in volatile memory. In this context, it is understood that references to non-volatile memory may include the portions of the non-volatile memory shadowed in volatile memory.

In a specific embodiment utilizing the EFI specification, the pointer to the architectural memory structure may be accessed by a performing an operating system runtime function, such as, the GetVariable service. Of course, it is contemplated that other embodiments may access the pointer via other services. It is contemplated that this access may be either direct or indirect.

Block 140 illustrates that the pointer to the reserved memory area may be read from the architectural memory structure. It is contemplated that the pointer may be read by utilizing an operating system service, directly reading from the physical memory address of the structure or another technique. It is contemplated that the architectural memory structure may be hidden or not directly accessible via operating system services during the runtime phase.

In a specific embodiment, utilizing the EFI specification, the pointer to the reserved memory space may be stored utilizing a GUID pointer pair. In addition, the operating system may not provide a service to conveniently access the architectural memory structure. In this embodiment, the pointer to the reserved memory may be accessed by walking through the contents of the architectural memory structure and searching for the GUID associated with the pointer. It is contemplated the GUID may be a predefined value. It is also contemplated that the GUID may be communicated to the runtime phase application utilizing a technique similar to that described in block 140; however, other techniques are within the scope of the disclosed subject matter.

Block 160 illustrates that once the pointer to the reserved memory area is read, the reserved memory area may be accessed. It is contemplated that the reserved memory area may be accessed either directly or via operating system services.

In the specific embodiment involving the video add-on card, described in relation to block 110, the video add-on card had instructions that might have been accessed during the runtime phase. During the pre-boot phase, these instructions were copied to a reserved portion of volatile memory. The pointer to that area may have been stored in an architectural memory structure, for example, the EFI System Table. A pointer to a structure was then stored in non-volatile memory. During the runtime phase, the pointers where followed to eventually determine the physical, or virtual, address of the reserved memory area. Once the address of the memory area was determined, the instructions stored there, in this embodiment, could be accessed and processed. This is one specific embodiment of the technique illustrated by FIG. 1, other embodiments are with the scope of the disclosed subject matter.

In a specific embodiment of the disclosed subject matter, the technique illustrated by FIG. 1 may be utilized within a system substantially compliant with the Extensible Firmware Interface (EFI) specification, described above. It is understood that this is merely one specific example and the disclosed subject matter is not limited by this illustrative example. In the pre-boot EFI environment, the EFI Core may allocate memory for the architecturally defined memory structure, System Table. This allocation may be in a memory region of type Runtime memory. The EFI Core will populate the allocated memory region with function pointers relative to services that are proxied through the System Table. An EFI compliant driver or application will be passed a pointer to the System Table. This application may then make EFI service calls, including but not limited to the installation of domain-specific information in the Globally Unique Identifier (GUID)/Pointer Pair using the boot service InstallConfigurationTable.

Therefore, an EFI compliant driver or application may, as illustrated by Block 110, reserve an area of memory for data storage. Using a private accessor or the InstallConfigurationTable boot service, the EFI application may, as illustrated by Block 120, install an entry into the GUID/Pointer table. The GUID/Pointer table includes a GUID to index and entry and a data component to store a Pointer value. The EFI application may ensure that of type Runtime Memory, if the intent is to have a Runtime agent or application ascertain the information.

A given EFI application may issue the ExitBootServices call to the EFI Core in order to terminate access to the EFI Services. The EFI core may then create an EFI variable with the string "System Table Proxy" and a GUID of EFI_SYSTEM_TABLE_PROXY. This variable and GUID may act as a pointer to the System Table architectural memory structure, as illustrated by Block 130. However, it is contemplated that this is merely one specific example and other embodiments of the disclosed subject matter are contemplated.

Once the system has completed the pre-boot phase, the system will operate in the runtime phase. If a kernel mode driver, for example, wishes to ascertain the location of the allocated area of memory, the driver may call the KeGetConfigurationInformation function or an equivalent OS system call. Using the EFI_SYSTEM_TABLE_PROXY GUID and the "System Table Proxy" variable, or some appropriate permutation/subset thereof, receive the physical address of the EFI System Table, as illustrated by Block 140. The driver may use the appropriate kernel or system call to get a physical mapping to the address of the EFI System Table. By casting a pointer to type EFI_SYSTEM_TABLE, and then referencing a member function of type EFI_CONFIGURATION_TABLE the location of the architectural memory structure, Configuration Table, may be obtained. The Configuration table is a subset of the System Table and includes the GUID/Pointer pair structure.

As illustrated by Block 150, the driver may walk through the Configuration table entries comparing GUIDs and looking for a driver specific GUID. Once found, the driver may read the appropriate Pointer entry and receive a pointer to the allocated memory space. The driver, as illustrated by Block 160, may then access the allocated memory space. The above is merely one embodiment of the disclosed subject matter and other embodiments may exist.

Figure 2:
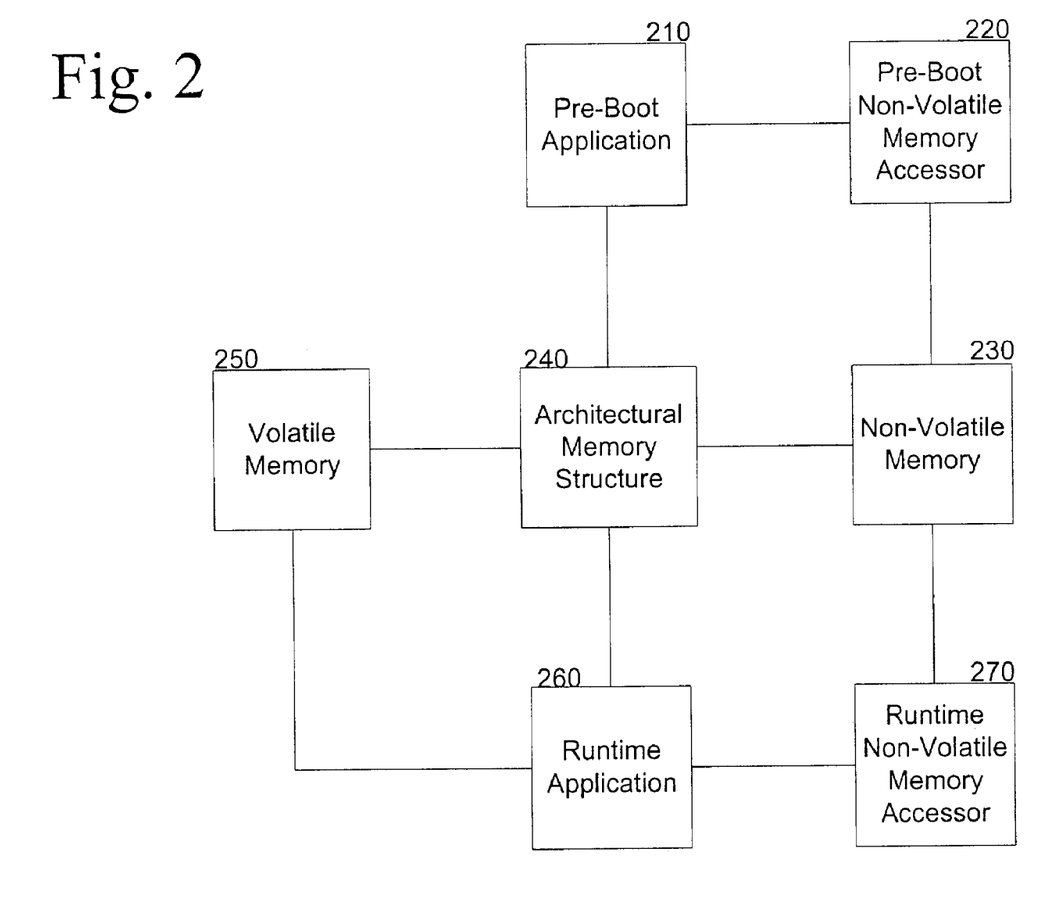
FIG. 2 is a block diagram illustrating an embodiment of a system for bridging access to a memory space across pre-boot and runtime phases in accordance with the disclosed subject matter.

FIG. 2 is a block diagram illustrating an embodiment of a system for bridging access to a memory space across pre-boot and runtime phases in accordance with the disclosed subject matter. It is contemplated that an embodiment of such a system may take many forms, such as for example, everything from small handheld electronic devices, such as personal data assistants and cellular phones, to application-specific electronic devices, such as set-top boxes, digital cameras, and other consumer electronics, to medium sized mobile systems, such as, notebook, sub-notebook, and tablet computers, to desktop systems, workstations, and servers. However, the system is not limited to the forms described above and other forms are contemplated.

An embodiment of a system in accordance with the disclosed subject matter may include a volatile memory space 250, an architectural memory structure 240 and a non-volatile memory space 230. In one embodiment, these memory spaces may function and be arranged in accordance with the blocks described in FIG. 1.

The system may also include a pre-boot application 210. It is contemplated that, in one embodiment, the pre-boot application may perform actions substantially in compliance with the pre-boot actions described above in regard to FIG. 1. It is contemplated that the pre-boot application may utilize a pre-boot non-volatile memory accessor 220 to access non-volatile memory space 230. It is contemplated that the pre-boot memory accessor may govern how and what information is read from or written to the non-volatile memory. It is also contemplated that the pre-boot memory accessor may govern access to only a portion of the non-volatile memory space.

The system may also include a runtime application 260. It is contemplated that, in one embodiment, the runtime application may perform actions substantially in compliance with the runtime actions described above in regard to FIG. 1. It is contemplated that the runtime application may utilize a runtime non-volatile memory accessor 270 to access non-volatile memory space 230. It is contemplated that the runtime memory accessor may govern how and what information is read from or written to the non-volatile memory. It is also contemplated that the runtime memory accessor may govern access to only a portion of the non-volatile memory space.

The techniques described herein are not limited to any particular hardware or software configuration; they may find applicability in any computing or processing environment. The techniques may be implemented in hardware, software, firmware or a combination thereof. The techniques may be implemented in programs executing on programmable machines such as mobile or stationary computers, personal digital assistants, and similar devices that each include a processor, a storage medium readable or accessible by the processor (including volatile and non-volatile memory and/or storage elements), at least one input device, and one or more output devices. Program code is applied to the data entered using the input device to perform the functions described and to generate output information. The output information may be applied to one or more output devices.

Each program may be implemented in a high level procedural or object oriented programming language to communicate with a processing system. However, programs may be implemented in assembly or machine language, if desired. In any case, the language may be compiled or interpreted.

Each such program may be stored on a storage medium or device, e.g., compact read only memory (CD-ROM), digital versatile disk (DVD), hard disk, firmware, magnetic disk or similar medium or device, that is readable by a general or special purpose programmable machine for configuring and operating the machine when the storage medium or device is read by the computer to perform the procedures described herein. The system may also be considered to be implemented as a machine-readable or accessible storage medium, configured with a program, where the storage medium so configured causes a machine to operate in a specific manner. Other embodiments are within the scope of the following claims.

While certain features of the disclosed subject matter have been illustrated and described herein, many modifications, substitutions, changes, and equivalents will now occur to those skilled in the art. It is, therefore, to be understood that the appended claims are intended to cover all such modifications and changes that fall within the true spirit of the disclosed subject matter.

What is claimed is:

1. A method of bridging a memory store across a pre-boot phase and a runtime phase comprising:
    during the pre-boot phase of system initialization, reserving an area for data storage at a physical volatile memory location;
    during the pre-boot phase, storing a pointer to the reserved memory area in an architectural memory structure;
    during the pre-boot phase, creating, within a non-volatile memory space that is accessible in both the pre-boot and the runtime phase, a pointer to the architectural memory structure;
    during the runtime phase, reading the pointer to the architectural memory structure; and
    during the runtime phase, reading the pointer to the reserved memory area from the architectural memory structure.

2. The method of claim 1, wherein the reserved memory area is utilized to configure a system driver.

3. The method of claim 2, wherein reading the pointer to architectural memory structure includes making an operating system level function call.

4. The method of claim 3, wherein the pointer to the reserved memory area in the architectural memory structure includes:
    a globally unique identifier index that identifies the pointer and
    a globally unique identifier data component that stores the pointer.

5. The method of claim 4, wherein reading the pointer to the reserved memory area includes:
    parsing the architectural memory structure to find a globally unique identifier index associated with the pointer to the reserved memory area; and
    reading the pointer to the reserved memory area by requesting the data component associated with the globally unique identifier index.

6. The method of claim 4, wherein the reserved memory area is designated as a type of runtime memory.

7. The method of claim 4, wherein the architectural memory structure includes pointers to services that are proxied through the architectural memory structure.

8. The method of claim 7, wherein the architectural memory structure includes at least one of the following:
    a boot service function pointer;
    a runtime service function pointer;
    data including version information;
    an extensible set of identifier and pointer pairs.

9. The method of claim 2, wherein reserving an area for data storage includes reserving more than one megabyte of memory.

10. The method of claim 2, wherein the pointer to the architectural memory structure is assigned a pre-defined variable name.

11. The method of claim 1, wherein the architectural memory structure includes a structure substantially compliant with an Extensible Firmware Interface System Table.

12. The method of claim 11, wherein reading the pointer to the architectural memory structure includes utilizing a runtime service substantially compliant with the Extensible Firmware Interface GetVariable service.

13. The method of claim 1, wherein the reserved memory area is utilized to configure a system driver.

14. A system having a pre-boot and a runtime phase comprising:
    a volatile memory;
    a non-volatile memory;
    a pre-boot application to reserve a portion of a volatile memory space;
    a pre-boot non-volatile memory accessor to store a pointer to the reserved portion of volatile memory within a non-volatile memory space;
    a runtime non-volatile memory accessor to read a pointer to the reserved portion of volatile memory space from the non-volatile memory;
    a runtime application to access the reserved portion of volatile memory; and
    an architectural memory structure to store a pointer to the reserved portion of volatile memory; and
    wherein the pointer within the non-volatile memory includes an indirect pointer.

15. The system of claim 14, wherein the non-volatile memory space includes a pointer to the architectural memory structure; and
    the architectural memory structure includes a pointer to the reserved portion of volatile memory space.

16. The system of claim 15, wherein the pre-boot application is capable of
    storing a pointer tote reserved portion of volatile memory within the architectural memory structure; and
    utilizing the pre-boot non-volatile memory accessor to store a pointer to the architectural memory structure within the non-volatile memory.

17. The system of claim 16, wherein the runtime non-volatile memory accessor is capable of preventing the runtime application from directly accessing the non-volatile memory.

18. The system of claim 17, wherein the runtime application is capable of
utilizing the runtime non-volatile memory accessor to access a pointer to the architectural memory structure; and
accessing the pointer to the reserved portion of volatile memory within the architectural memory space.

19. A system having a pre-boot and a runtime phase comprising:
a volatile memory;
a non-volatile memory;
a pre-boot application to reserve a portion of a volatile memory space;
a pre-boot non-volatile memory accessor to store a pointer to the reserved portion of volatile memory within a non-volatile memory space;
a runtime non-volatile memory accessor to read a pointer to the reserved portion of volatile memory space from the non-volatile memory;
a runtime application to access the reserved portion of volatile memory; and
an architectural memory structure that is substantially compliant with the Extensible Firmware Interface System Table;
wherein the architectural memory structure is capable of storing a pointer to the reserved portion of volatile memory; and
the pointer to the reserved portion of volatile memory within the non-volatile memory includes a pointer to the architectural memory structure.

20. The system of claim 19, wherein the pointer to the reserved portion of volatile memory within the architectural memory structure includes:
a globally unique identifier index that identifies the pointer, and
a globally unique identifier data component that stores the pointer.

21. The system of claim 20, wherein the runtime application is capable of accessing the pointer to the reserved portion of volatile memory within the architectural memory structure by
parsing the architectural memory structure to find the globally unique identifier index associated with the pointer to the reserved portion of volatile memory; and
reading the globally unique identifier data component associated with the globally unique identifier key.

22. The system of claim 19, wherein the pre-boot non-volatile memory accessor is capable of storing the pointer to the architectural memory structure within the non-volatile memory utilizing a pre-defined variable name; and
the runtime non-volatile memory accessor is capable of accessing the pointer to the architectural memory structure within the non-volatile memory utilizing the pre-defined variable name.

23. The system of claim 22, wherein the runtime non-volatile memory accessor is capable of accessing the pointer to the architectural memory structure utilizing the Extensible Firmware Interface GetVariable service.

24. A system having a pre-boot and a runtime phase comprising:
a volatile memory;
a non-volatile memory;
a pre-boot application to reserve a portion of a volatile memory space;
a pre-boot non-volatile memo accessor to store a pointer to the reserved portion of volatile memory within a non-volatile memory space;
a runtime non-volatile memory accessor to read a pointer to the reserved portion of volatile memory space from the non-volatile memory;
a runtime application to access the reserved portion of volatile memory; and
wherein the runtime non-volatile memory accessor is capable of preventing the runtime application from directly accessing the non-volatile memory.

25. An article comprising:
a storage medium having a plurality of machine accessible instructions, wherein when the instructions are executed by a processor, the instructions provide for bridging a memory store across a pre-boot phase and a runtime phase by:
during the pre-boot phase of system initialization, reserving an area for data storage at a physical volatile memory location;
during the pre-boot phase, storing a pointer to the reserved memory area in an architectural memory structure;
during the pre-boot phase, creating, within a non-volatile memory space that is accessible in both the pre-boot and the runtime phase, a pointer to the architectural memory structure;
during the runtime phase, reading the pointer to the architectural memory structure; and
during the runtime phase, reading the pointer to the reserved memory area from the architectural memory structure.

26. The article of claim 25, wherein the instructions that provide for reading the pointer to the architectural memory structure includes instructions that provide for making an operating system level function call.

27. The article of claim 26, wherein the instructions that provide for reading the pointer to the reserved memory area includes instructions that provide for:
parsing the architectural memory structure to find a globally unique identifier index associated with the pointer to the reserved memory area; and
reading the pointer to the reserved memory area by requesting a data component associated with the globally unique identifier key.

28. The article of claim 25, wherein the instructions that provide for the pointer to the architectural memory structure being assigned a pre-defined variable name key.

29. A method comprising:
during a pre-boot phase, reserving an area for data storage at a physical volatile memory location;
during the pre-boot phase, receiving a pointer to a system table;
during the pre-boot phase, installing a driver specific globally unique identifier and a pointer to the reserved memory area within the system table;
during a runtime phase; receiving a pointer to the system table;
during the runtime phase, utilizing the driver specific globally unique identifier to retrieve the pointer to the reserved memory area.
wherein receiving a pointer to a system table includes:
an Extensible Firmware Interface Core passing the driver a pointer to the Extensible Firmware Interface System Table.

30. The method of claim 29, wherein installing a driver specific globally unique identifier and a pointer to the reserved memory area within the system table includes:
  calling an Extensible Firmware Interface InstallConfigurationTable boot service to install a globally unique identifier and pointer pair within the system table; and
wherein, reserving an area for data storage at a physical volatile memory location ensuring an allocation of the area for data storage is of type Runtime Memory.

31. The method of claim 30, further including:
  during the pre-boot phase, saving a pointer to the system table in a form that is accessible during the runtime phase.

32. A method comprising:
  during a pre-boot phase, reserving an area for data storage at a physical volatile memory location;
  during the pre-boot phase, receiving a pointer to a system table;
  during the pre-boot phase, installing a driver specific globally unique identifier and a pointer to the reserved memory area within the system table;
  during a runtime phase; receiving a pointer to the system table;
  during the runtime phase, utilizing the driver specific globally unique identifier to retrieve the pointer to the reserved memory area.
  wherein saving a pointer to the system table includes:
  creating an Extensible Firmware interface variable with a string "System Table Proxy"; and
  creating a globally unique identifier of EFI_SYSTEM_TABLE_PROXY.

33. A method comprising:
  during a pre-boot phase, resenting an area for data storage at a physical volatile memory location;
  during the pre-boot phase, receiving a pointer to a system table;
  during the pre-boot phase, installing a driver specific globally unique identifier and a pointer to the reserved memory area within the system table;
  during a runtime phase; receiving a pointer to the system table;
  during the runtime phase, utilizing the driver specific globally unique identifier to retrieve the pointer to the reserved memory area,
  wherein receiving a pointer to the system table includes:
  calling a system call KeGetConfigurationInformation; and
  using an Extensible Firmware Interface variable with the string "System Table Proxy" to obtain the physical address of the system table.

34. The method of claim 33, wherein utilizing the driver specific globally unique identifier to retrieve the pointer to the reserved memory area includes:
  casting pointer to the system table to type EFI_SYSTEM_TABLE; and
  referencing a member function to type EFI_CONFIGURATION_TABLE.

35. The method of claim 33, wherein utilizing the driver specific globally unique identifier to retrieve the pointer to the reserved memory area includes:
  walking through the system table to find the driver specific globally unique identifier within the system table; and
  retrieving the pointer associated with the driver specific globally unique identifier.

36. An article comprising:
  a storage medium having a plurality of machine accessible instructions, wherein when the instructions are executed by a processor, the instructions provide for bridging a memory store across a pre-boot phase and a runtime phase by:
  during the pre-boot phase, reserving an area for data storage at a physical volatile memory location;
  during the pre-boot phase, receiving a pointer to a system table;
  during the pre-boot phase, installing a driver specific globally unique identifier and a pointer to the reserved memory area within the system table;
  during the runtime phase; receiving a pointer to the system table;
  during the runtime phase, utilizing the driver specific globally unique identifier to retrieve the pointer to the reserved memory area
  wherein the instructions that provide for receiving a pointer to a
  system table includes instructions that provide for:
  an Extensible Firmware Interface Core passing the driver a pointer to the Extensible Firmware Interface System Table.

37. The article of claim 36, wherein the instructions that provide for installing a driver specific globally unique identifier and a pointer to the reserved memory area within the system table includes instructions that provide for:
  calling an Extensible Firmware Interface InstallConfigurationTable boot service to install a globally unique identifier and pointer pair within the system table; and
wherein, reserving an area for data storage at a physical volatile memory location ensuring an allocation of the area for data storage is of type Runtime Memory.

38. The article of claim 37, further including instructions that provide for:
  during the pre-boot phase, saving a pointer to the system table in a form that is accessible during the runtime phase.

39. The article of claim 38, wherein the instructions that provide for saving a pointer to a system table includes instructions that provide for:
  creating an Extensible Firmware Interface variable with the string "System Table Proxy"; and
  creating a globally unique identifier of EFI_SYSTEM_TABLE_PROXY.

40. An article comprising:
  a storage medium having a plurality of machine accessible instructions, wherein when the instructions are executed by a processor, the instructions provide for bridging a memory store across a pre-boot phase and a runtime phase by:
  during the pre-boot phase, reserving an area for data storage at a physical volatile memory location;
  during the pre-boot phase, receiving a pointer to a system table;
  during the pre-boot phase, installing a driver specific globally unique identifier and a pointer to the reserved memory area within the system table;
  during the runtime phase; receiving a pointer to the system table;
  during the runtime phase, utilizing the driver specific globally unique identifier to retrieve the pointer to the reserved memory area wherein the instructions that provide for receiving a pointer to a system table includes instructions that provide for:

calling the system call KeGetConfigurationInformation; and using an Extensible Firmware Interface variable with the string "System Table Proxy" to obtain the physical address of the system table.

41. The article of claim 40, wherein the instructions that provide for utilizing the driver specific globally unique identifier to retrieve the pointer to the reserved memory area includes instructions that provide for:

casting painter to the system table to type EFI_SYSTEM TABLE; and referencing a member function to type EFI_CONFIGURATION_TABLE.

42. The article of claim 40, wherein the instructions that provide for utilizing the driver specific globally unique identifier to retrieve the pointer to the reserved memory area includes instructions that provide for:

walking through the system table to find the driver specific globally unique identifier within the system table; and retrieving the pointer associated with the driver specific globally unique identifier.

* * * * *

UNITED STATES PATENT AND TRADEMARK OFFICE
CERTIFICATE OF CORRECTION

PATENT NO. : 7,082,523 B2  
APPLICATION NO. : 10/321022  
DATED : July 25, 2006  
INVENTOR(S) : Zimmer et al.

It is certified that error appears in the above-identified patent and that said Letters Patent is hereby corrected as shown below:

In column 3, at line 6, delete "Oh" and insert --0h--.

In column 3, at line 14, delete "firm-ware" and insert --firmware--.

In column 4, at line 4, delete "stricture" and insert --structure--.

In column 8, at line 19, delete "pains" and insert --pairs--.

In column 8, at line 63, delete "tote" and insert --to the--.

In column 9, at line 2, delete "runt-" and insert --run- --.

In column 9, at line 3, delete "ime" and insert --time--.

In column 11, at line 33, delete "resenting" and insert --reserving--.

In column 13, at line 13, delete "painter" and insert --pointer--.

Signed and Sealed this

Twentieth Day of November, 2007

JON W. DUDAS  
*Director of the United States Patent and Trademark Office*